United States Patent
Vogler

(10) Patent No.: US 8,899,295 B2
(45) Date of Patent: Dec. 2, 2014

(54) ULTRASONIC OSCILLATING UNIT WITH HOLDER

(75) Inventor: Ulrich Vogler, Uhldingen-Mühlhofen (DE)

(73) Assignee: Herrmann Ultraschalltechnik GmbH & Co. KG, Karlsbad (DE)

( * ) Notice: Subject to any disclaimer, the term of this patent is extended or adjusted under 35 U.S.C. 154(b) by 726 days.

(21) Appl. No.: 12/990,367

(22) PCT Filed: Apr. 24, 2009

(86) PCT No.: PCT/EP2009/055005
§ 371 (c)(1),
(2), (4) Date: Oct. 29, 2010

(87) PCT Pub. No.: WO2009/156207
PCT Pub. Date: Dec. 30, 2009

(65) Prior Publication Data
US 2011/0042014 A1    Feb. 24, 2011

(30) Foreign Application Priority Data
Jun. 27, 2008  (DE) .......................... 10 2008 002 744

(51) Int. Cl.
*B32B 37/00* (2006.01)
*B23K 20/10* (2006.01)
*B29C 65/08* (2006.01)
*B29C 65/00* (2006.01)

(52) U.S. Cl.
CPC ............. *B23K 20/106* (2013.01); *B29C 65/085* (2013.01); *B29C 66/83411* (2013.01); *B29C 66/83417* (2013.01)
USPC .................................... 156/580.2; 156/580.1

(58) Field of Classification Search
USPC ........... 156/73.1, 580, 580.1, 580.2; 264/442, 264/443, 444, 445; 425/174.2; 228/1.1, 228/110.1; 310/323.01, 323.18
See application file for complete search history.

(56) References Cited

U.S. PATENT DOCUMENTS

| | | | |
|---|---|---|---|
| 4,975,133 A * | 12/1990 | Gochermann | 156/73.1 |
| 5,096,532 A | 3/1992 | Neuwirth et al. | |
| 5,590,866 A | 1/1997 | Cunningham | |
| 5,645,681 A * | 7/1997 | Gopalakrishna et al. | 156/580.2 |
| 5,667,608 A * | 9/1997 | Rajala et al. | 156/73.1 |
| 5,976,316 A * | 11/1999 | Mlinar et al. | 156/580.2 |
| 7,243,894 B2 | 7/2007 | Haregoppa et al. | |
| 2004/0005431 A1 | 1/2004 | Moulin et al. | |
| 2008/0237299 A1 | 10/2008 | Vogler et al. | |
| 2009/0032198 A1 | 2/2009 | Sorensen et al. | |

FOREIGN PATENT DOCUMENTS

| | | |
|---|---|---|
| CH | 671529 A5 | 9/1989 |
| DE | 9102187 U1 | 5/1991 |
| DE | 202005016252 U1 | 12/2006 |

(Continued)

*Primary Examiner* — James Sells
(74) *Attorney, Agent, or Firm* — Paul & Paul

(57) ABSTRACT

The present invention concerns an ultrasonic oscillating unit comprising a converter and a sonotrode (1) optionally connected to the converter by way of an amplitude transformer (2), wherein the sonotrode (1) has a sealing surface (10) which is substantially in the form of a circular ring or a cylinder surface and the ultrasonic oscillating unit has a holder (3) for fastening the ultrasonic oscillating unit to a machine stand. To achieve that it is proposed according to the invention that the holder (3) is fastened directly to the sonotrode (1).

15 Claims, 8 Drawing Sheets

(56) References Cited

FOREIGN PATENT DOCUMENTS

| | | |
|---|---|---|
| DE | 60119724 T2 | 4/2007 |
| DE | 102005063230 B3 | 7/2007 |
| EP | 1455957 | 9/2004 |
| WO | 9959760 A1 | 11/1999 |
| WO | 03051532 A1 | 6/2003 |
| WO | 2006099872 A1 | 9/2006 |
| WO | WO 2006/0099872 * | 9/2006 |

* cited by examiner

ULTRASONIC OSCILLATING UNIT WITH HOLDER

BACKGROUND OF THE INVENTION

The present invention concerns an ultrasonic oscillating unit comprising a converter and a sonotrode optionally connected to the converter by way of an amplitude transformer, wherein the sonotrode has a sealing surface which is substantially in the form of a cylinder surface and the ultrasonic oscillating unit has a holder for fastening the ultrasonic oscillating unit to a machine stand of an ultrasonic welding apparatus.

Ultrasonic welding is a method of joining plastic materials. Ultrasound is a mechanical oscillation above the audible limit. The frequency range begins at about 20 kHz and extends to frequencies of 1 GHz. Such ultrasonic frequencies are frequently generated by means of piezoelectric sound transducers (converters) from electrical energy. That mechanical oscillation energy is applied to the workpiece or the material to be processed by way of the sonotrode which is connected to the converter, possibly by way of an amplitude transformation member (booster). The surface of the sonotrode which is intended to come into contact with the material to be processed is also referred to as the sealing surface.

The ultrasonic oscillating unit thus represents a structure which oscillates in operation and consists of the converter, optionally the amplitude transformation member and the sonotrode.

To effectively transmit the ultrasonic oscillation by means of the ultrasonic oscillating unit it is necessary to cause the ultrasonic oscillating unit to assume a resonance condition. In dependence on the structure of the ultrasonic oscillating unit it has a multiplicity of natural frequencies. It is only when the converter generates a natural frequency of the ultrasonic oscillating unit that resonant oscillation of the oscillating unit occurs. Therefore the converter and the ultrasonic oscillating unit must be tuned to each other.

Strictly speaking the resonance frequency differs somewhat from the natural frequency as any real system is damped. Hereinafter however—as is also frequently the case in the literature—the terms resonance frequency and natural frequency are used synonymously.

The most important natural frequency of the ultrasonic oscillating unit is generally the natural frequency at which a standing longitudinal oscillation with wave nodes and wave antinodes is produced in the ultrasonic oscillating unit. In that case a respective antinode occurs at the ends of the sonotrode.

The converter which generates the corresponding ultrasonic excitation frequency is connected to one of the ends. Optionally connected between the converter and the sonotrode is a booster or amplitude transformer which changes the amplitude of the ultrasonic oscillation but not the frequency. The provision of a booster does not influence the natural frequency of the sonotrode and thus the position of the oscillation nodes of the longitudinal oscillation.

For many situations of use the amplitude transformation member and the sonotrode are in one piece, that is to say they can no longer be optically distinguished. In order therefore to distinguish the sonotrode from the amplitude transformation member it is necessary to determine the position of the oscillation antinodes of the pure longitudinal oscillation. The sonotrode always includes the sealing surface. Any portion which extends in the longitudinal direction from oscillation maximum to oscillation maximum and which does not influence the natural frequency of the pure longitudinal oscillation is not part of the sonotrode. In contrast, if such a portion influences the natural frequency of the pure longitudinal oscillation, that is to say it cannot be removed without substantially changing the natural frequency, then it belongs to the sonotrode.

When processing materials by means of ultrasound, in general the material to be processed is positioned between the sonotrode and a counterpart tool (which does not belong to the oscillating structure), which is also referred to as the anvil. The sonotrode in contact with the material to be processed then transmits the ultrasonic energy to the material to be processed which is for example thereby welded or severed. The heat required for plasticising the web of material is generated by the conversion of ultrasound oscillations into frictional energy. By virtue of interface and molecular friction therefore heat is produced, which causes the plastic material to begin to melt.

With most sonotrodes the longitudinal ultrasonic oscillation is used for energy transfer by way of the sealing surface.

There are however also sonotrodes having a sealing surface which is substantially in the form of the peripheral surface of a cylinder, which use the radial ultrasonic oscillation produced transversely relative to the longitudinal direction of propagation of the ultrasonic oscillation, for energy transfer. Those sonotrodes frequently comprise a substantially bar-shaped portion to which the converter and optionally the booster are connected, and a wheel-shaped or bell-shaped portion projecting radially beyond the bar-shaped portion. The wheel-shaped or bell-shaped portion has the sealing surface.

Those sonotrodes generally have two principal natural oscillation modes.

The one natural oscillation mode substantially corresponds to the longitudinal resonance oscillation of the bar-shaped portion. That resonance oscillation is of a relatively great longitudinal oscillation amplitude. However also linked thereto is forced influencing of the material in the transverse direction, that is to say perpendicularly to the bar axis. That forced influencing is expressed in a thickness oscillation which is propagated radially relative to the bar axis. The oscillation amplitude of the thickness oscillation is relatively low, the result thereof being that the major part (more than 90%) of the oscillation energy in the oscillation system is contained in the longitudinal oscillation.

The other natural oscillation mode substantially corresponds to the resonance of the radial oscillation of the wheel portion. Linked thereto is a comparatively slight (forced) oscillation in the longitudinal direction. The major part (generally more than 90%) of the oscillation energy in the oscillation system is contained in the radial oscillation in that natural oscillation mode.

In the case of rotational welding the second natural oscillation mode is used as a relatively great radial oscillation can be produced in the wheel portion of the sonotrode by producing a relatively small longitudinal oscillation in the bar-shaped portion of the sonotrode.

Thus, sonotrodes having a sealing surface in the form of a cylinder surface are known, which are used for continuous ultrasonic treatment of moved webs of material. In operation those sonotrodes are rotated about their longitudinal axis so that the sealing surface in the form of the cylinder surface moves at substantially the same speed as the web of material to be processed. Thus in the case of those sonotrodes there is only ever a small part of the sealing surface, in contact with the web of material.

The ultrasonic unit, that is to say the oscillating structure, must be kept suitably positioned relative to the material or web of material to be processed. In that respect, high demands are to be made on the holder of the ultrasonic unit as on the one hand the holder must ensure that the sealing surface is held exactly at its position relative to the material to be processed while on the other hand the ultrasonic unit must remain oscillatable so that only a negligible part of the ultrasonic energy is transmitted into the machine stand.

As a standing ultrasonic wave is formed within the oscillating structure in the longitudinal direction, that is to say oscillation nodes and oscillation antinodes are formed, oscillating structures are frequently supported at the oscillation nodes of the longitudinal oscillation. Decoupling of the thickness oscillation, that is to say the transverse oscillation, is generally effected by using O-rings. In addition, the holding effect is generally provided in the region of the oscillating structure where only oscillations of low amplitude are to be expected.

The holder using O-rings admittedly provides very good oscillation decoupling but it is very soft in the radial and axial directions so that precise positioning of the sonotrode relative to the material to be processed cannot be implemented as in the excited condition or when coming into contact with the material to be processed the sonotrode can 'go away'.

Rigid mountings have occasionally also been proposed. Thus for example FIG. 6 of EP 1 455 957 B1 shows a rigid Z-shaped mounting arrangement for a rotational sonotrode. By means of that mounting arrangement, relatively good oscillation decoupling can be achieved with at the same time good stiffness for the holder in the axial direction. It will be noted however that the holder is relatively soft in the radial direction so that any bending forces occurring can only be limitedly accommodated. In addition the Z-shaped mounting arrangement takes up a relatively large amount of space in the radial direction, which in turn limits the possible uses of the rotational sonotrode.

FIG. 13 of EP 1 455 957 already discloses a rotational sonotrode with two Z-shaped mounting arrangements disposed at both sides of the sonotrode. In this case also relatively good oscillation decoupling with good stiffness in the axial direction can be achieved. The mounting arrangement is very soft in the radial direction and although bending forces can be better accommodated by virtue of the two-sided mounting arrangements, in comparison with the single-sided mounting configuration, the ultrasonic unit can nonetheless suffer from temporary flexing, with corresponding adverse consequences for the welding result. In this construction also the amount of space required at the periphery of the ultrasonic unit is relatively great by virtue of the Z-shaped holder.

In addition WO 99/059760 shows a mounting arrangement which engages the oscillation maxima. For that purpose a thin metal disk is clamped between two oscillating elements. The disk in turn is of a special configuration to carry the high oscillation amplitude and not transmit it to the radially outwardly disposed mounting location. That disk mounting arrangement exhibits relatively good stiffness in the radial direction but nonetheless the disk can only be fastened to mounting locations of low oscillation amplitudes and offers only a low level of axial stiffness for the oscillating unit. In addition the space required in the radial direction is very great. Furthermore the thin mounting disks can only limitedly carry radial forces and are susceptible to stress cracks.

For that reason in DE 10 2005 063 230 B3 the applicant has already proposed an ultrasonic oscillating unit having two boosters arranged in succession in the axial direction and on to which a sleeve-shaped holder is fitted, which is respectively supported at flanges which project radially beyond the boosters and which are arranged at oscillation nodes of the oscillating unit. That structure provides for a very flexurally stiff mounting arrangement. In addition very high radial forces can be carried by that mounting arrangement, while oscillation decoupling at the same time is very good. The sleeve holder also has the advantage that the structural height in the radial direction is very slight. There is however the disadvantage that the structural height increases in the axial direction due to the provision of two boosters.

SUMMARY OF THE INVENTION

Therefore taking that state of the art as the basic starting point the object of the present invention is to provide an ultrasonic oscillating unit having a sonotrode in the form of a cylinder surface, which is of low structural height both in the axial and in the radial directions, which allows good oscillation decoupling and provides good stiffness at the same time radially and axially.

According to the invention that object is attained in that the holder is fastened directly to the sonotrode.

The axial structure can be reduced by that measure as the holder engages directly on the sonotrode and thus in the axial direction very close to the sealing surface or even in the region thereof. Although in the case of sonotrodes in the form of a cylinder surface the transverse oscillations are considerable, it has surprisingly been found that, with this kind of sonotrode, the holder can be fastened directly to the sonotrode without a large proportion of the ultrasonic oscillation being transmitted into the holder.

In addition it is possible to completely dispense with a radial decoupling element whereby the radial structure can also be reduced to a minimum.

In a preferred embodiment the holder provides for rigid fastening of the sonotrode to the machine stand, that is to say without corresponding resilient elements such as for example O-rings.

For example precision roller bearings, toothed belt pulley or precision clamping nuts can be mounted directly in the holder.

In a preferred embodiment the holder engages substantially at an oscillation node of the longitudinal ultrasonic oscillation so that no movement is to be envisaged in the axial direction. It will be noted however that the oscillation movement is not to be disregarded at that point in the transverse direction, that is to say in the radial direction. Preferably the fastening is so selected in regard to geometry and material that the fastening element moves synchronously at the connecting location with the radial amplitude of the sonotrode.

Preferably the fastening element is such that the radial movement of the fastening element is reduced by virtue of the radial oscillation, in the axial direction. Thus the fastening element can be for example of a sleeve-shaped configuration. Preferably at its end that sleeve engages the sonotrode. The fastening sleeve in turn is preferably fastened to the machine stand or further installation parts at a point spaced from the engagement points on the sonotrode. The provided spacing between the contact point between the fastening sleeve and the sonotrode on the one hand and the engagement point for fastening the fastening sleeve to the machine stand on the other hand provides that the radial movement of the fastening element at the holding point relative to the machine stand is markedly less than the radial movement at the engagement point relative to the sonotrode. The remaining residual oscillation which is generally markedly less than a micrometer has however no detrimental effects.

In that respect the fastening elements are to be so designed that the fastening elements do not have a natural resonance in the region of the main resonance of the rotational sonotrode. In general the natural resonances of the fastening element should not be in a range of ±1000 Hz around the main resonance of the sonotrode.

The rotational sonotrodes known in the state of the art, that is to say known sonotrodes having a sealing surface in the form of a cylinder surface, have however only one oscillation node in the longitudinal ultrasonic oscillation, which is exactly at the center of the wheel-shaped portion so that no holding at the oscillation node is possible with those sonotrodes.

In accordance with the invention therefore the ultrasonic oscillating unit has a sonotrode which upon resonant excitation exhibits at least two and preferably three oscillation nodes. Such a sonotrode can be implemented for example by the natural frequency of a longitudinal mode or a multiplicity of that natural frequency of a bar-shaped portion of the sonotrode being substantially equal to the natural frequency of a radial mode or a multiplicity of that natural frequency of a wheel-shaped or bell-shaped portion of the sonotrode. More specifically in that way both radial and also longitudinal oscillations can be caused to resonate at the same time. The result of this however is that the oscillation node which is produced with ideal longitudinal oscillations is divided in the center of the sealing surface into three mutually spaced oscillation nodes.

Alternatively or in combination therewith the sonotrode can comprise a bar-shaped portion and a wheel-shaped portion which is preferably arranged in the center in the longitudinal direction of the bar-shaped portion and which is of a larger diameter than the bar-shaped portion, wherein the ratio of the length a of the bar-shaped portion to the diameter D1 of the wheel-shaped portion is greater than 0.5, preferably greater than 0.8 and particularly preferably greater than 1.

In addition it is particularly desirable if the ratio of the length a of the bar-shaped portion to the diameter D1 of the wheel-shaped portion is less than 2, preferably less than 1.5 and particularly preferably less than 1.15.

Alternatively or in combination therewith the ultrasonic oscillating unit can be so designed that a natural mode of the sonotrode is excited by the converter, at which the oscillation energy is divided into the longitudinal oscillation and the radial oscillation. In that case the ratio of the energy in the radial oscillation to the energy in the longitudinal oscillation is preferably between 20:80 and 80:20 and particularly preferably between 30:70 and 70:30 and at best between 40:60 and 60:40.

By virtue of the fact that a not inconsiderable proportion of the oscillation energy is contained both in the longitudinal oscillation and also in the radial oscillation, then in the region of the sonotrode, in which the wheel-shaped portion is fastened to the bar-shaped portion, that can involve superimpositioning of the oscillations and the occurrence of a plurality of (mostly three) oscillation nodes, at the position of which the holder can then optionally engage.

It is assumed that according to the invention the described sonotrodes can also advantageously be used without a holder directly on the sonotrode.

It should be pointed out however that at the specified points the thickness oscillation or the transverse ultrasonic oscillation is not negligible. Therefore during operation the situation can involve tilting of the ultrasonic oscillating unit with respect to the longitudinal axis. Therefore further measures possibly have to be taken to impart certain resilient properties to the holder in the radial direction. It is generally possible to dispense therewith if the sonotrode is of a substantially rotationally symmetrical configuration and the holder, surrounding the sonotrode in a sleeve-like arrangement, is supported thereat so that the thickness oscillation or transverse oscillation is then radially uniformly transmitted to the holder and forces acting on the holder radially are mutually substantially cancelled out.

In a preferred embodiment the holder is made from a different material from the sonotrode. Particularly preferably oscillation-damping materials are used for the holder. Good results were achieved with high-quality steel and casting materials such as for example gray cast iron.

A further preferred embodiment provides that the holder is additionally fastened to the amplitude transformer or the converter. That measure means that the flexural stiffness of the holder is further increased. In that case both the sonotrode and also the amplitude transformer or converter can have an abutment and the holder can have a sleeve which is supported both against the abutment on the sonotrode and also the abutment on the amplitude transformer or the converter. Basically the holder could in principle be similar to the holder shown in FIG. 1 of DE 10 2005 063 230 with the difference that according to the invention a second booster is not used, but the sleeve is supported directly against the sonotrode.

It is advantageous if the holder also engages the booster or the converter at an oscillation node of the ultrasonic oscillating unit.

The holder proposed according to the invention is particularly advantageous if the sonotrode is a rotational sonotrode, wherein there are provided two holders connected to the sonotrode on opposite sides thereof. In that case the holder is advantageously rigidly connected to the sonotrode as it is only then that exact positioning of the sonotrode in relation to the material to be processed is guaranteed.

DESCRIPTION OF THE DRAWINGS

Further advantages, features and possible uses will be apparent from the description hereinafter of preferred embodiments and the related Figures in which.

DETAILED DESCRIPTION OF THE INVENTION

Figure 1:
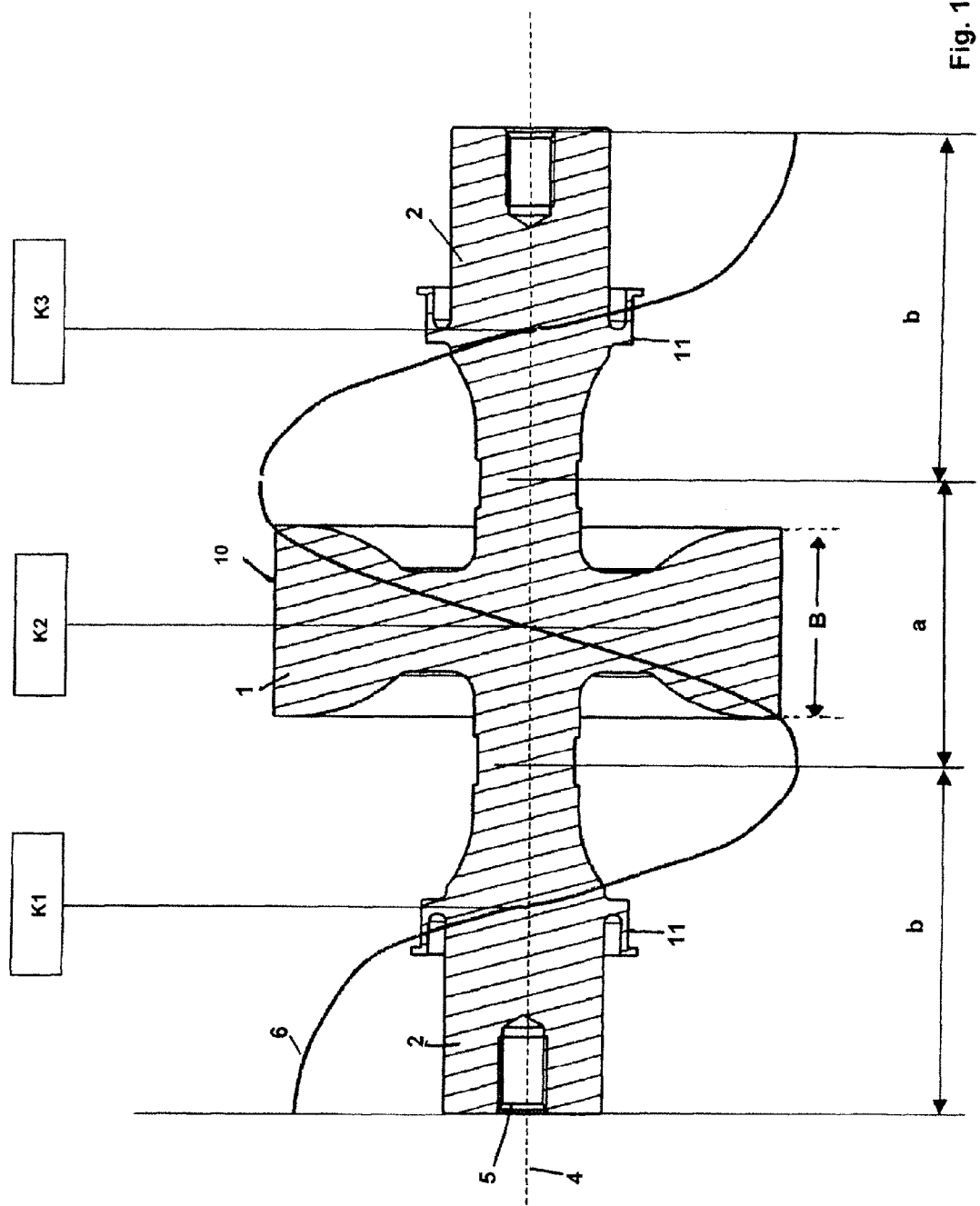
FIG. 1 shows a sectional view of an ultrasonic oscillating unit of the state of the art.

FIG. 1 shows a part of an ultrasonic oscillating unit of the state of the art. The illustrated part of the ultrasonic oscillating unit comprises the centrally arranged rotational sonotrode 1 of a length a and two amplitude transformation members 2 of a length b, formed on both sides of the sonotrode 1.

The rotational sonotrode 1 has a sealing surface 10 in the form of a cylinder surface, which comes into contact with the material to be processed. The sealing surface 10 is of a length B in the axial direction.

The configuration of the amplitude 6 of the ultrasonic longitudinal oscillation is diagrammatically shown in FIG. 1.

It will be seen that the ultrasonic longitudinal oscillation passes through an oscillation node K2 at the center of the sealing surface 10. The amplitude maxima establish the interface between the sonotrode 1 and the amplitude transformation members 2. One of the amplitude transformation members 2 can be fastened to a converter (not shown) by means of one of the bores 5. The ultrasonic longitudinal oscillation is then propagated along the longitudinal axis 4.

To hold the ultrasonic oscillating unit Z-shaped holding rings 11 are formed on the amplitude transformation members 2, wherein the Z-shaped holding rings 11 are arranged substantially in the region of an oscillation node K1, K3.

Figure 2:
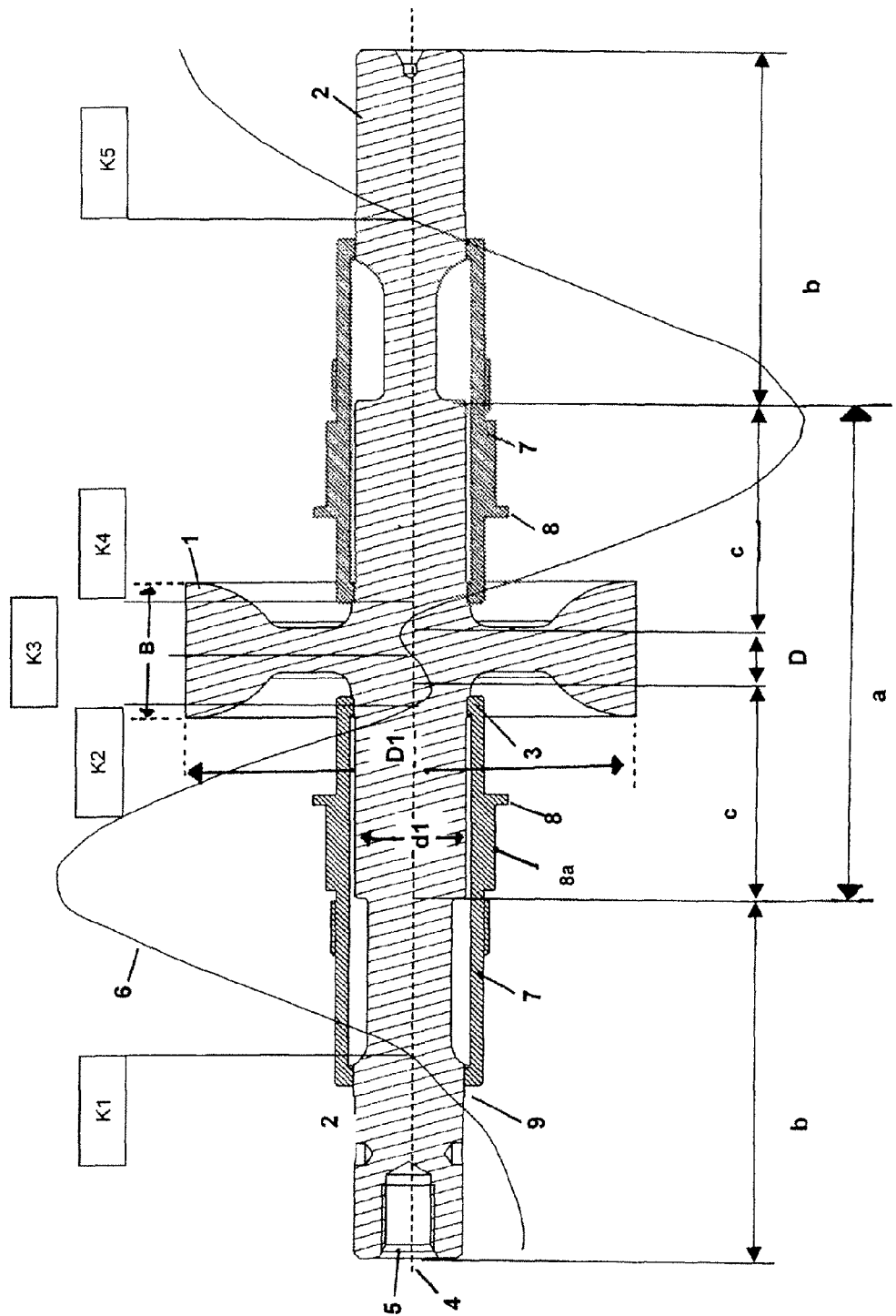
FIG. 2 shows a sectional view of a first embodiment of the invention.

FIG. 2 shows a first embodiment of the present invention. In this case also the amplitude 6 of the longitudinal oscillation is diagrammatically shown.

In the illustrated region the longitudinal oscillation presents five oscillation nodes K1, K2, K3, K4, K5, between each of which there is a respective oscillation maximum. As three oscillation nodes K2, K3, K4 are arranged in the region of the sealing surface 10, the interface between the sonotrode 1 and adjoining amplitude transformation members 2 is established by the oscillation maxima which are between the first node K1 and the second node K2, and between the fourth node K4 and the fifth node K5 respectively. The axial length of the sonotrode is again identified by the letter a. The axial length of the two amplitude transformation portions is denoted by the letter b. The sealing surface 10 of the sonotrode is of a diameter $D_1$ while the diameter of the sonotrode outside the sealing surface is $d_1$. In other words the sonotrode 1 comprises two cylindrical connecting portions of the diameter $d_1$ and a wheel-shaped portion arranged between the connecting portions, of the diameter $D_1$, at the cylindrical peripheral surface of which the sealing surface 10 is to be found. It has been shown that the ratio d1/D1 is at the best less than 0.7 and particularly preferably less than 0.35.

In that case the length b of the amplitude transformation portion in the longitudinal direction is greater than the longitudinal extent B of the sealing surface 10, wherein the length b of the amplitude transformation member in the longitudinal direction is preferably at least twice as great and particularly preferably at least three times as great as the longitudinal extent B of the sealing surface 10.

If the sonotrode 1 in FIG. 1 is compared to the sonotrode in FIG. 2 it will be seen that the oscillation node at the center of the sealing surface in FIG. 2 was divided into three oscillation nodes K2, K3, K4 and two (small) oscillation maxima. The spacing between the two oscillation maxima is identified by D in FIG. 2. Although therefore there are oscillation maxima of the longitudinal oscillation in the region of the sealing surface 10, which are generally linked to oscillation minima of the transverse or thickness oscillation, the welding result at the sealing surface 10 is practically unaffected.

In addition the length b of the amplitude transformation member is greater than the spacing c between the interface between the amplitude transformation member and the sonotrode and the first (small) oscillation maximum at the level of the sealing surface 10, the spacing c again being greater than the spacing D between the two (small) oscillation maxima at the level of the sealing surface 10.

It has been found that in a preferred embodiment the ratio d1/b of the diameter $d_1$ of the cylindrical connecting portions of the sonotrode 1 to the longitudinal extent b of the amplitude transformation member is less than or equal to 0.7 and preferably less than 0.35.

In the illustrated preferred embodiment the diameter $D_1$ of the sealing surface 10 in the form of a cylinder surface approximately corresponds to the longitudinal extent b of the amplitude transformation member.

To hold the ultrasonic oscillating unit there are two sleeves 7 which at their ends are supported at corresponding projections 3, 9 on the sonotrode 1 and the amplitude transformation member 9. The sleeves 7 in turn have an annularly outwardly extending flange 8 at which the ultrasonic oscillating unit can be held. In the illustrated embodiment the sleeves 7 have reinforced portions 8a. The sleeves 7 could also be held at the reinforced portions 8a by means of bearings, for example radial bearings or cone bearings. In that case the flange 8 would only serve as an abutment surface.

The sleeves 7 can be shrunk on to the ultrasonic oscillating unit, that is to say the corresponding contact portions of the sleeve 7 are spaced slightly further away from each other than the corresponding abutment portions 3 and 9 on the sonotrode and the amplitude transformation member so that the sleeve 7 can be put into its desired position either by cooling the ultrasonic oscillating unit or heating the sleeve 7. As soon as the ultrasonic oscillating unit and the sleeve 7 are at the same temperature the sleeve 7 is supported at its two contact portions at the corresponding contact portions 3, 9 on the sonotrode 1 and the amplitude transformation member 2. It will be appreciated that any other manner of fastening the sleeve 7 to the sonotrode could also be used. Examples of alternative fastening modes are screwing or soldering.

The support points of the sleeve 7 lie on the one hand in the oscillation node K2, K4 of the sonotrode and on the other hand in the oscillation node K1, K5 of the amplitude transformation member 2. In the illustrated embodiment therefore the holder even engages the sonotrode 1 within the sealing surface portion.

It will be seen that half a wavelength is between the node K3 which is exactly at the center of the sealing surface 10 and the node K2, in the longitudinal direction.

Figure 3:
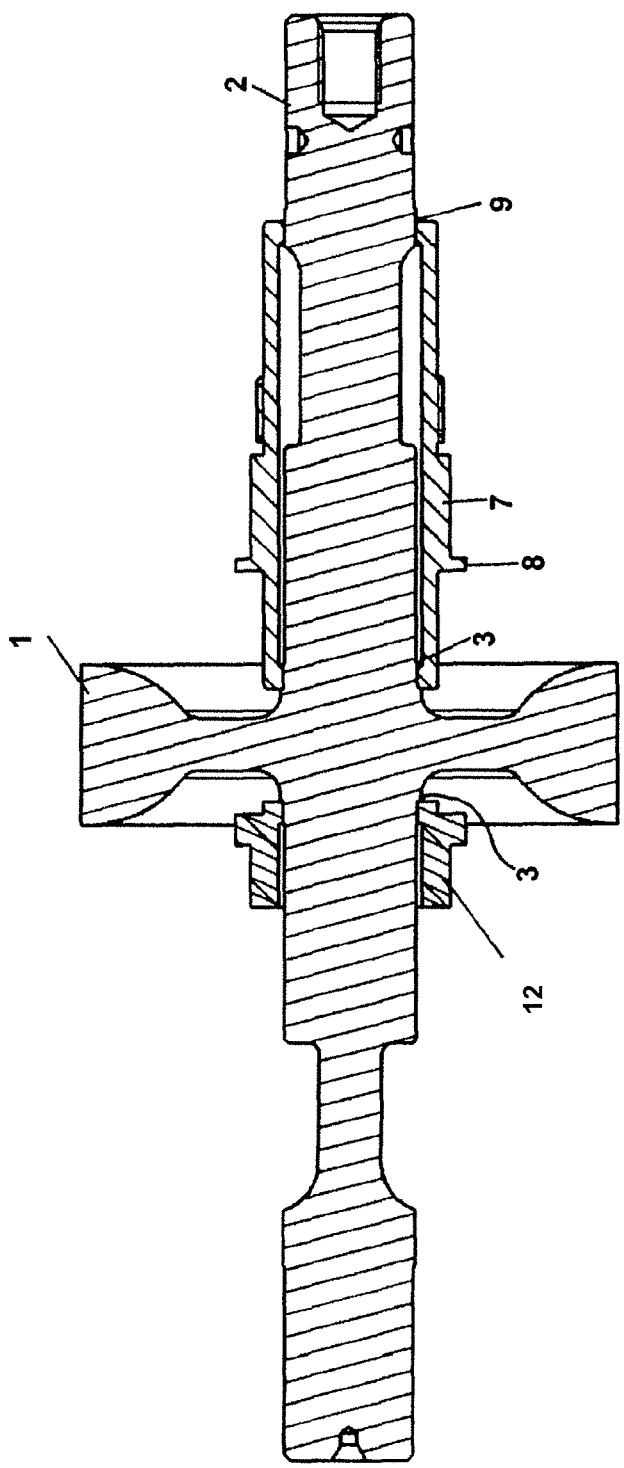
FIG. 3 shows a sectional view of a second embodiment of the invention.

It will be appreciated that the sleeve-shaped holder does not necessarily have to be provided on both sides of the sonotrode 1. Thus for example as shown in FIG. 3 illustrating a second embodiment, there may be only one support element 12 on the one side of the sonotrode 1, the support element 12 being supported only at a point 3. It will be appreciated that it is also possible to dispense with the sleeve-shaped holder on both sides of the sonotrode. Embodiments can also be envisaged, in which the amplitude transformation members are omitted and the sonotrode is fastened directly to a converter.

It will be appreciated that the sonotrode could also be held only on one side.

Figure 3A:
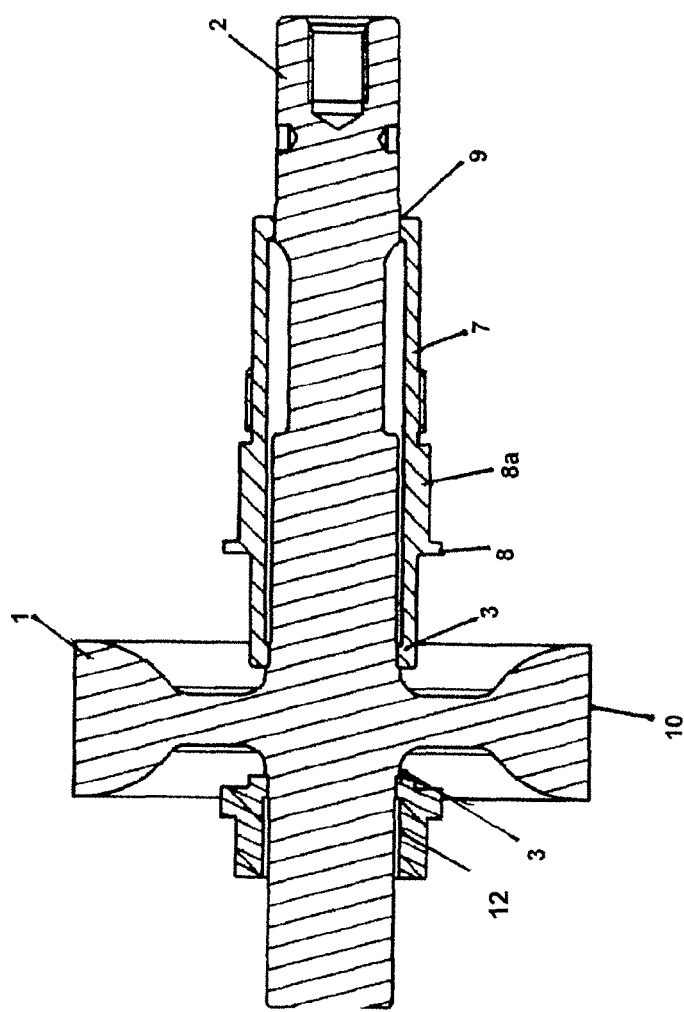
FIG. 3a shows a sectional view of a third embodiment of the invention.

A third embodiment is shown in FIG. 3a. Unlike the FIG. 3 embodiment, an amplitude transformation member is provided here only on one side of the sonotrode so that it was possible to reduce the structural height.

Figure 3B:
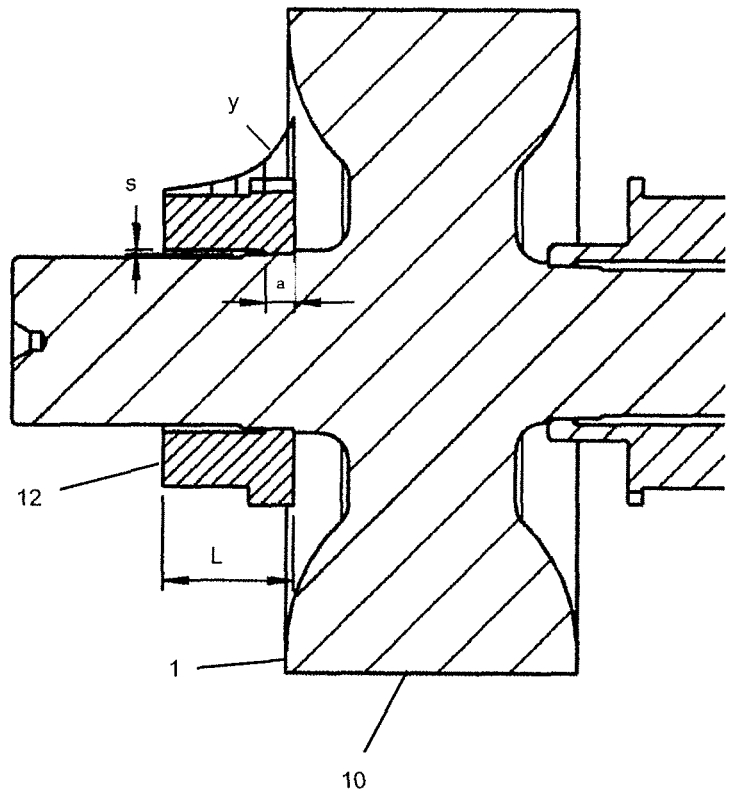
FIG. 3b shows an enlarged view of FIG. 3a, FIG. 3c shows an enlarged view of FIG. 3a, FIG. 4 shows a perspective view of the FIG. 2 embodiment.
Figure 3C:
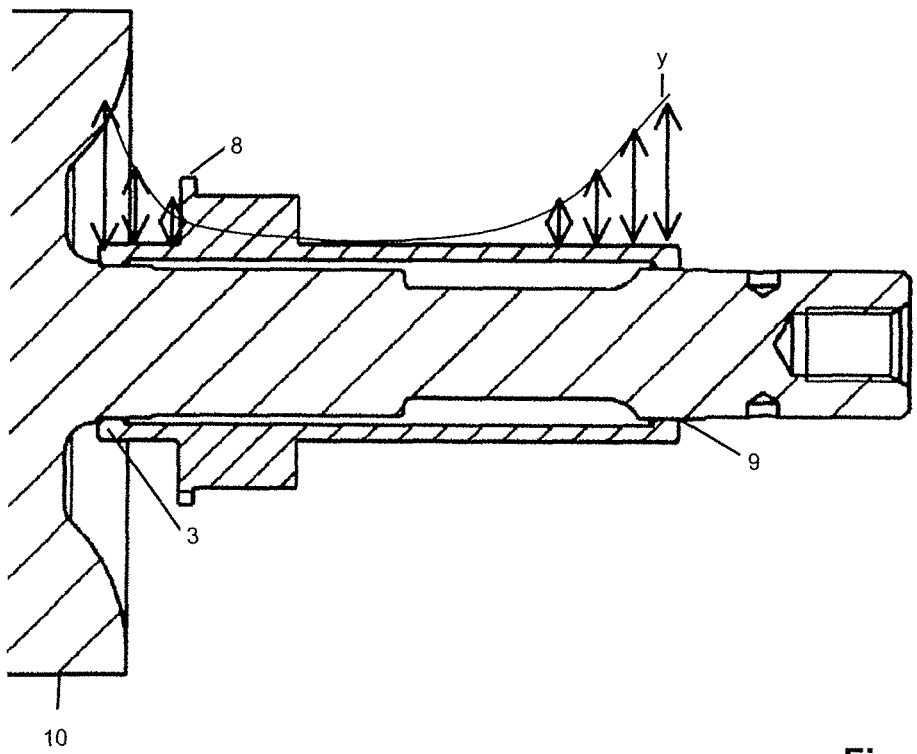

The respective holding elements are shown on an enlarged scale in FIGS. 3b and 3c. Thus FIG. 3b shows a holder in the form of a support element 12. That support element 12 which is substantially in the form of a ring or sleeve is supported against the sonotrode with the contact surface 3 of the width a which extends in an annular configuration around the sonotrode. That contact surface 3 is arranged at a longitudinal oscillation node of the sonotrode 1. At that point however there are transverse oscillations, the amplitude strength of which has been diagrammatically shown in the Figure by the identification Y. It will be seen that the transverse oscillation, that is to say the movement in the radial direction, is at the greatest in the region of the contact surface 3 and decreases rapidly in the axial direction so that almost no radial movement can be found at the end of the support element 12, that is remote from the contact surface 3. The geometry and material of the support element 12 must be so selected that the support element 12 does not have any natural resonance in the region of the main resonance of the sonotrode.

As shown in FIG. 3b the support element 12 bears against the sonotrode only in the region of the contact surface 3. Outside the contact surface 3 the support element 12 is spaced at the spacing s from the sonotrode. The width a of the contact surface is typically in the range of 0.5 to 10 mm and is particularly preferably in the range of between 3 and 5 mm. In that respect it is to be noted that the permissible pressure in relation to area between the support element 12 on the one hand and the sonotrode 1 on the other hand is not exceeded.

The spacing s is typically in the range of between 0.1 and 2 mm and is particularly preferably between 0.5 and 1 mm. The spacing facilitates assembly and ensures that no contact occurs between the sonotrode and the support element 12 outside the contact surface 3 during operation of the sonotrode.

In FIG. 3c the holder is of a sleeve-shaped configuration. The sleeve-shaped element bears against the sonotrode at two contact surfaces 3, 9. In this case also, although the contact points 3 and 9 are respectively disposed in the region of a longitudinal oscillation node, radial oscillations are to be envisaged, as were diagrammatically shown in FIG. 3b as the line Y. In this case also it is to be noted that the radial oscillation occurring within the sleeve is substantially limited to the region around the contact surfaces 3 and 9 while the radial oscillation has already markedly died away for example in the region of the flange 8 so that corresponding installation parts or the machine stand can be fastened here without further disadvantages.

Figure 4:
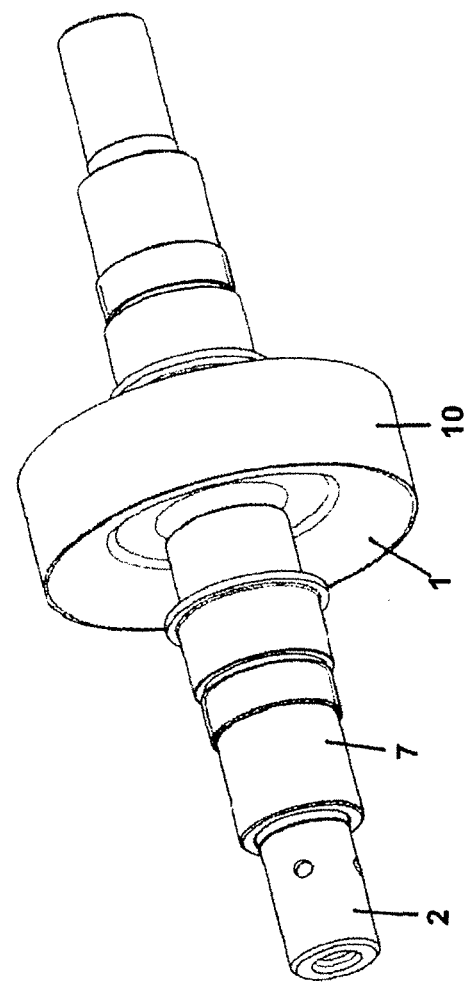
Figure 5:
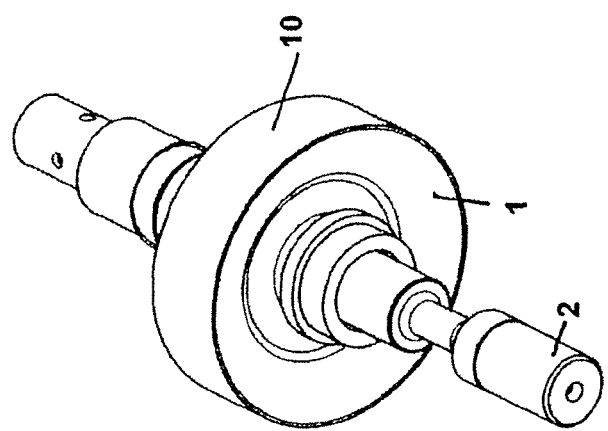
FIG. 5 shows a perspective view of the FIG. 3 embodiment.

FIGS. 4 and 5 show perspective views of the embodiment of FIGS. 2 and 3.

Figure 6:
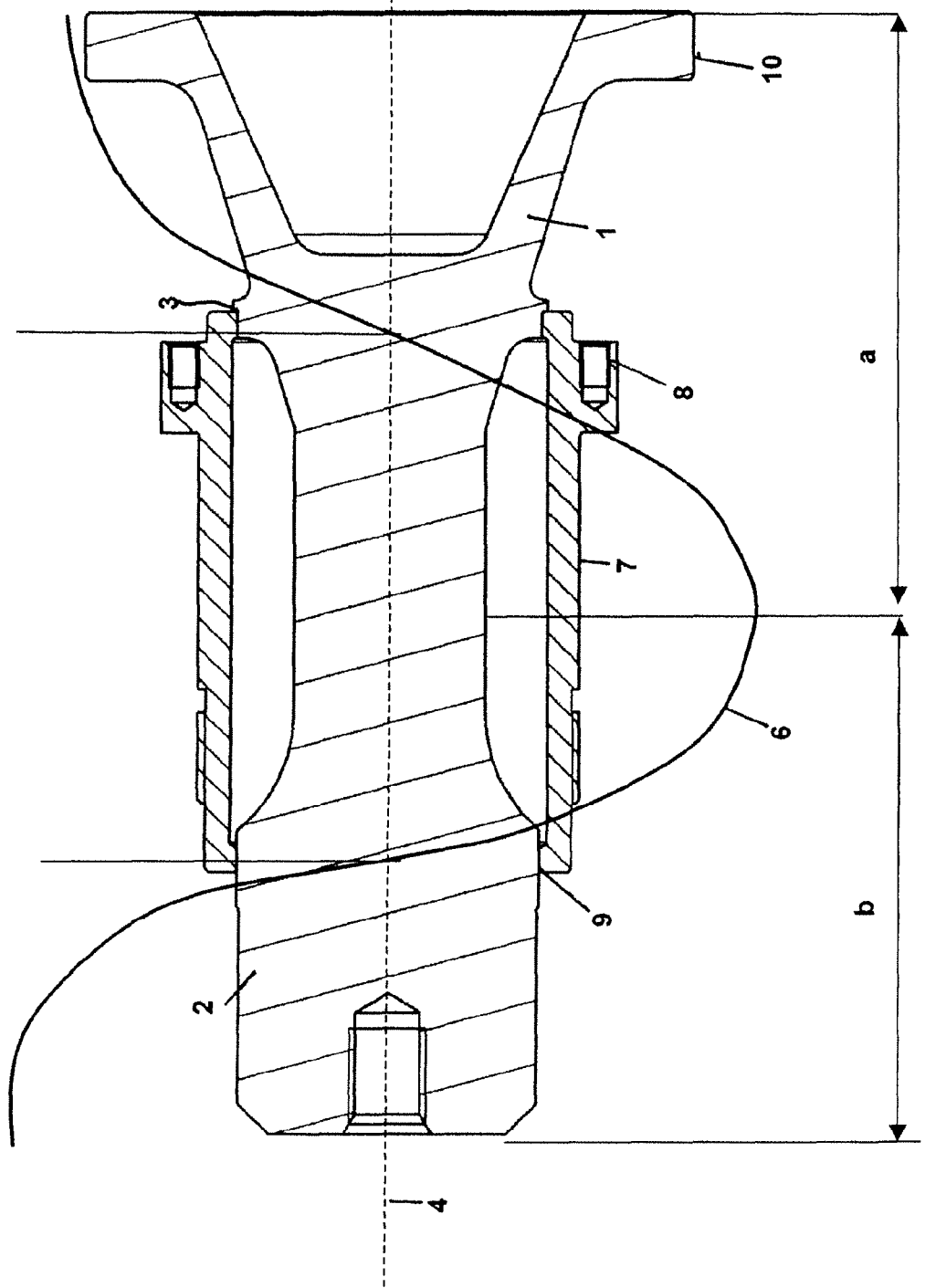
FIG. 6 shows a sectional view of a fourth embodiment of the invention.

FIG. 6 shows a sectional view of a fourth embodiment. Here, the sonotrode used is in the form of a so-called bell sonotrode 1 which also has a sealing surface 10 which is in the form of a cylinder surface and which is oriented in the axial direction. Here too there is shown a sleeve-shaped holder 7 which on the one hand is supported directly at the sonotrode 1 at the point 3 which again is at a node point of the ultrasonic longitudinal oscillation and on the other hand is supported at a support point 9 of the amplitude transformation member 2, which also substantially lies at an oscillation node of the ultrasonic oscillation.

Figure 7:
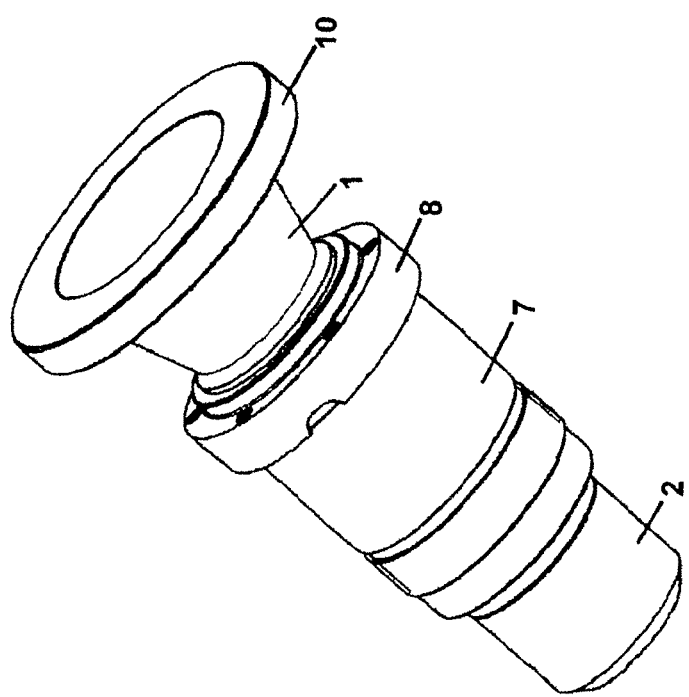
FIG. 7 shows a perspective view of the FIG. 6 embodiment.

Finally FIG. 7 for further clarification purposes shows a perspective view of the FIG. 6 embodiment.

LIST OF REFERENCES

1 sonotrode
2 amplitude transformation member
3 support point
4 longitudinal axis
5 bore
6 amplitude
7 sleeve
8 flange
8a reinforced portions
9 abutment portion
10 sealing surface
11 Z-shaped holding ring
12 support element
a length of the sonotrode
b length of the booster
K1-K5 oscillation nodes

The invention claimed is:

1. An ultrasonic oscillating unit comprising a converter and a sonotrode (1) optionally connected to the converter by way of an amplitude transformer (2), wherein the sonotrode (1) has a sealing surface (10) which is substantially in the form of a circular ring or a cylinder surface and the ultrasonic oscillating unit has a holder (3) for fastening the ultrasonic oscillating unit to a machine stand, characterised in that the holder (3) is fastened directly to the sonotrode (1),
    characterised in that the holder (3) is additionally fastened to the amplitude transformer (2) or the converter, and
    characterised in that both the sonotrode (1) and also the amplitude transformer (2) or converter have an abutment and the holder (3) has a sleeve which bears both against the abutment of the sonotrode (1) and also the abutment of the a amplitude transformer (2) or the converter.

2. An ultrasonic oscating unit as set forth in claim 1 characterised in that the sonotrode (1) is substantially rotationally symmetrical.

3. An ultrasonic oscillating unit as set forth in claim 1 characterised in that at least the abutment of the sonotrode (1) is of an annular configuration or comprises a plurality of abutment elements arranged annularly in the peripheral direction around the sonotrode.

4. An ultrasonic oscillating unit as set forth in one of claims 1 and 3 characterised in that the holder (3) is additionally fastened to the amplitude transformer (2) or the converter.

5. An ultrasonic oscillating unit as set forth in claim 1 characterised in that the sonotrode (1) is a rotational sonotrode, wherein there are provided two holders (3) which are connected to the sonotrode (1) on opposite sides thereof.

6. An ultrasonic oscillating unit as set forth in one of claims 1 through 3 characterised in that the holder (3) is rigidly connected to the sonotrode (1).

7. An ultrasonic oscillating unit as set forth in one of claims 1 through 3 characterised in that there is provided an amplitude transformation member, wherein the ratio B/b of the width (B) of the sealing surface (10) in the longitudinal direction to the length (b) of the amplitude transformation portion in the longitudinal direction is less than 0.35.

8. An ultrasonic welding apparatus comprising a machine stand to which an ultrasonic oscillating unit as set forth in one of claims 1 through 3 and a counterpart tool is fastened.

9. A sonotrode for use in an ultrasonic welding apparatus comprising a machine stand to which an ultrasonic oscillating unit and a counterpart tool is fastened,
    characterised in that the sonotrode has three oscillation nodes in the case of resonant ultrasonic excitation,
    wherein said ultrasonic oscillating unit comprises a converter and a sonotrode (1) optionally connected to the converter by way of an amplitude transformer (2), wherein the sonotrode (1) has a sealing surface (10) which substantially in the form of a circular ring or a cylinder surface and the ultrasonic oscillating unit has a holder (3) for fasting the ultrasonic oscillating unit to a machine stand, characterised in that the holder (3) is fastened directly to the sonotrode (1).

10. A sonotrode as set forth in claim 9 characterised in that the sonotrode has a bar-shaped portion and a wheel-shaped portion radially enlarging beyond the bar-shaped portion, wherein a natural frequency of a longitudinal mode or a multiple of said natural frequency of the bar-shaped portion of the sonotrode is substantially equal to a natural frequency of a radial oscillation mode or a multiple of said natural frequency of a wheel-shaped portion of the sonotrode.

11. A sonotrode as set forth in claim 9 characterised in that the sonotrode is rotationally symmetrical.

12. An uitrasonic oscillating unit comprising a sonotrode as set forth in claim 9 characterised in that the converter is so designed that a natural mode of the sonotrode can be excited, in which the oscillation energy is divided to the longitudinal oscillation and the radial oscillation, wherein the ratio of the energy in the radial oscillation to the energy in the longitudinal oscillation is between 40:60 and 60:40.

13. A sonotrode for use in an ultrasonic welding apparatus as set forth in claim 9 characterised in that the sonotrode comprises a bar-shaped portion and a wheel-shaped portion arranged at the center in the longitudinal direction of the bar-shaped portion, wherein the diameter of the wheel-shaped portion is larger than the diameter of the bar-shaped portion and the ratio of the length of the bar-shaped portion to the diameter of the wheel-shaped portion is greater than 1.

14. A sonstrode as set forth in claim 13 characterised in that the ratio of the length of the bar-shaped portion to the diameter of the wheel-shaped portion is less than 1.15.

15. An ultrasonic oscillating unit comprising a converter and a sonctrode (1) optionally connected to the converter by way of an amplitude transformer (2), wherein the sonotrode (1) has a sealing surface (10) which is substantially in the form of a circular ring or a cylinder surface and the ultrasonic oscillating unit has a holder (3) for fastening the ultrasonic oscillating unit to a machine stand, characterised in that the holder (3) is fastened directly without a radial decoupling element to the sonotrode (1).

\* \* \* \* \*

UNITED STATES PATENT AND TRADEMARK OFFICE
CERTIFICATE OF CORRECTION

PATENT NO. : 8,899,295 B2  
APPLICATION NO. : 12/990367  
DATED : December 2, 2014  
INVENTOR(S) : Ulrich Vogler Page 1 of 1

It is certified that error appears in the above-identified patent and that said Letters Patent is hereby corrected as shown below:

In the Claims

Column 10, Line 16, delete "a"

Column 10, Line 17, change "oscating" to --oscillating--

Column 10, Line 55, change "fasting" to --fastening--

Column 11, Line 1, change "uitrasonic" to --ultrasonic--

Signed and Sealed this  
Fourteenth Day of July, 2015

Michelle K. Lee  
*Director of the United States Patent and Trademark Office*